No. 733,901. PATENTED JULY 14, 1903.
F. E. CASE.
METHOD OF BRAKING MOVING LOADS.
APPLICATION FILED MAR. 20, 1902.
NO MODEL. 3 SHEETS—SHEET 1.
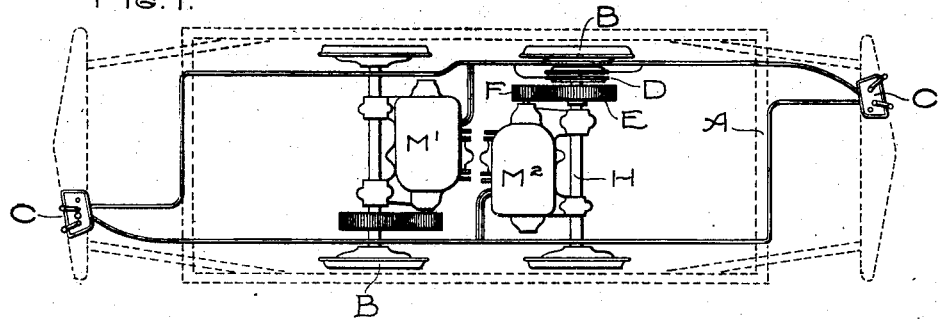
Fig. 1.
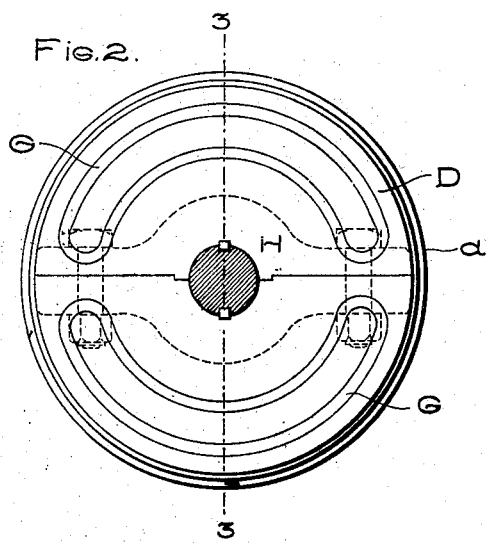
Fig. 2.
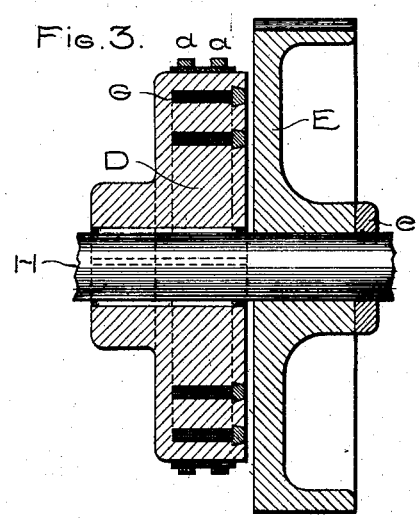
Fig. 3.
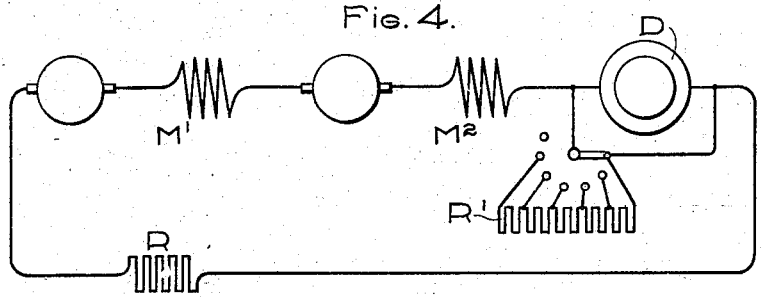
Fig. 4.
Fig. 5.
WITNESSES: INVENTOR:
Harry H. Tilden Frank E. Case.
Helen Orford by Albert G. Davis
Att'y No. 733,901. PATENTED JULY 14, 1903.
F. E. CASE.
METHOD OF BRAKING MOVING LOADS.
APPLICATION FILED MAR. 20, 1902.
NO MODEL. 3 SHEETS—SHEET 2.
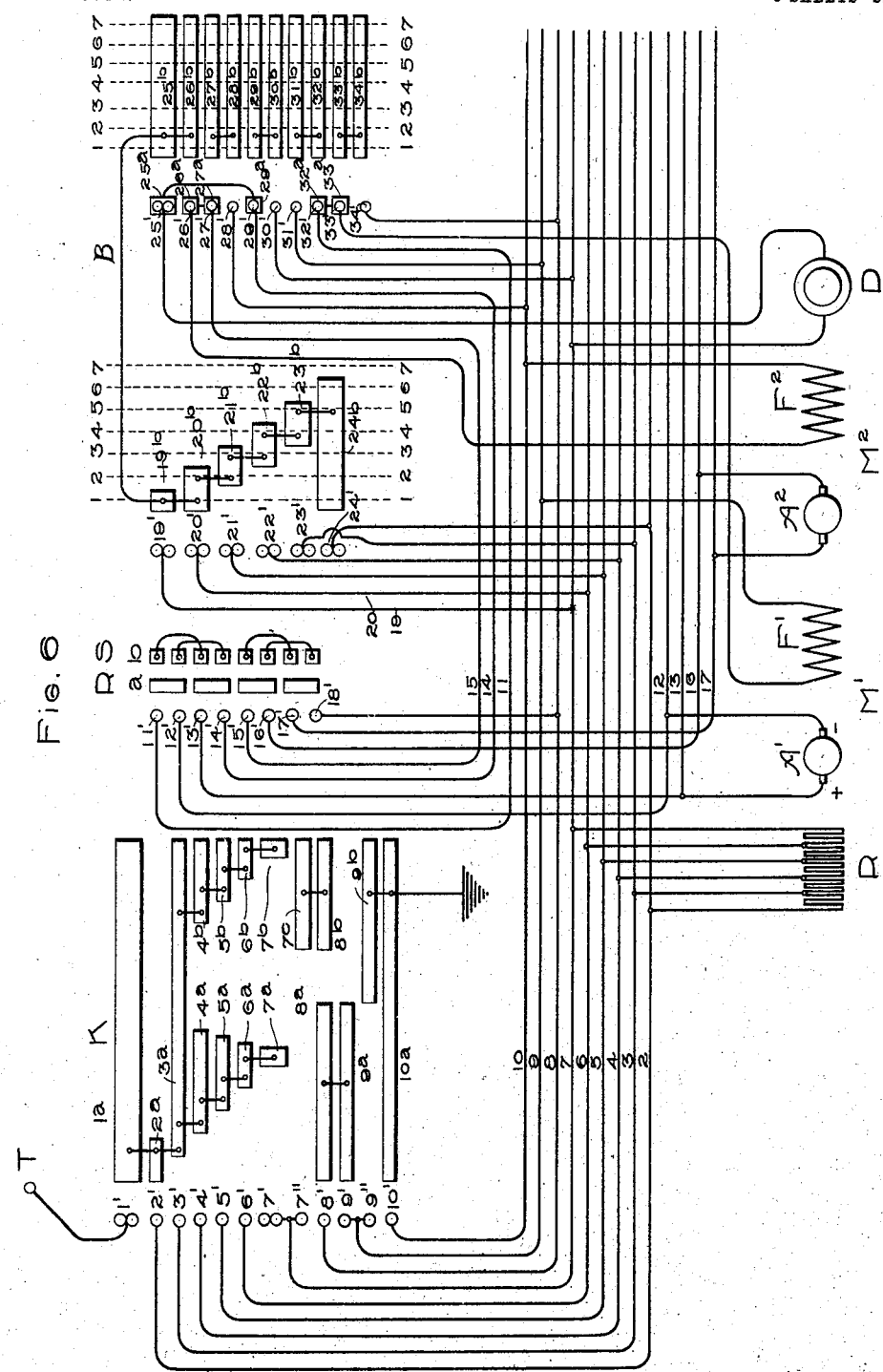
WITNESSES
Harry H Tilden
Helen Orford
INVENTOR
Frank E Case
by Albert G Davis
Atty.

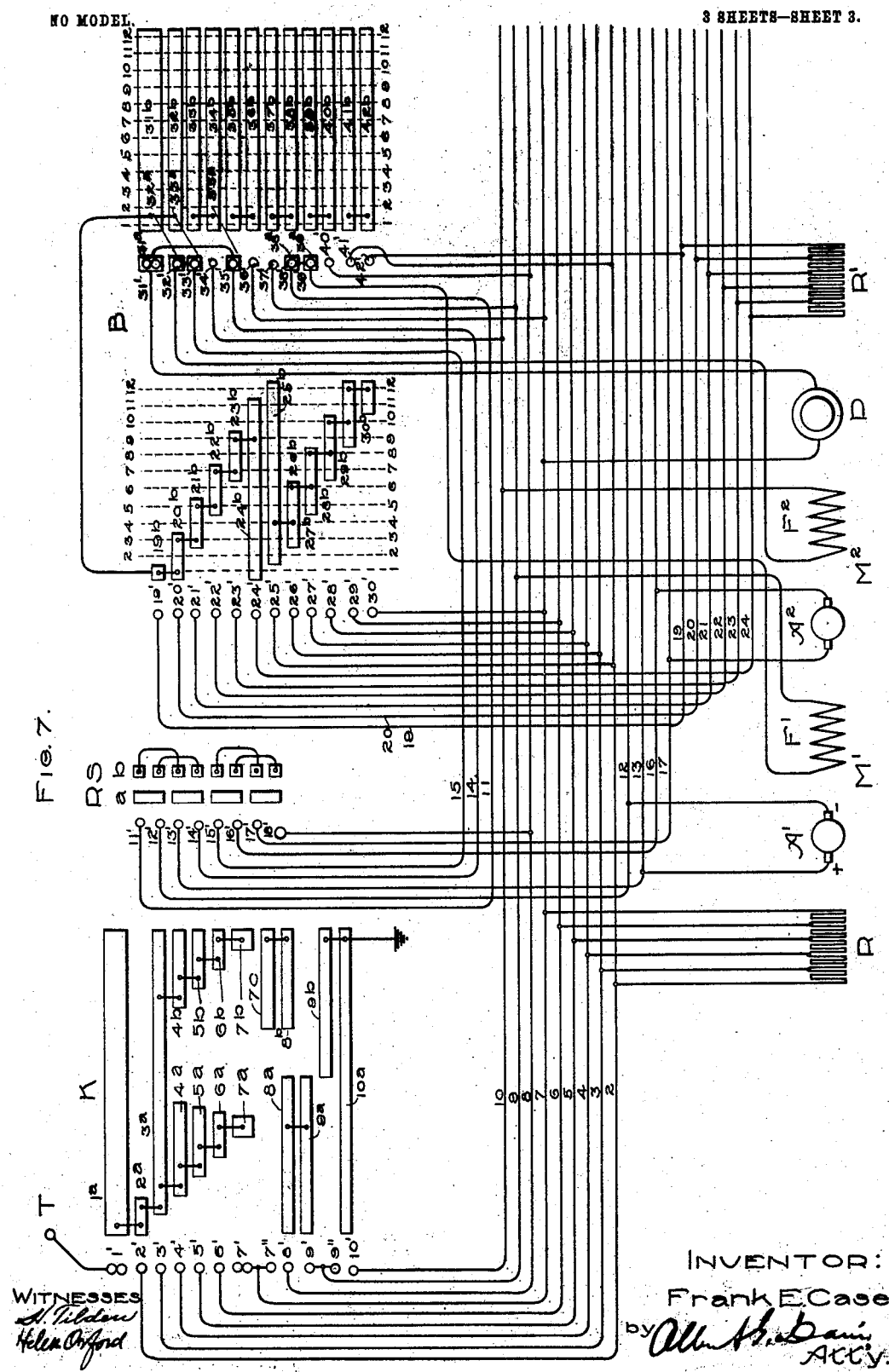

No. 733,901. Patented July 14, 1903.

UNITED STATES PATENT OFFICE.

FRANK E. CASE, OF SCHENECTADY, NEW YORK.

METHOD OF BRAKING MOVING LOADS.

SPECIFICATION forming part of Letters Patent No. 733,901, dated July 14, 1903.

Original application filed February 19, 1900, Serial No. 5,690. Divided and this application filed March 20, 1902. Serial No. 99,065. (No model.)

*To all whom it may concern:*

Be it known that I, FRANK E. CASE, a citizen of the United States, residing at Schenectady, county of Schenectady, State of New York, have invented certain new and useful Improvements in Methods of Braking Moving Loads, of which the following is a specification.

This application is a division of my prior application, Serial No. 5,690, filed February 19, 1900.

My invention relates to a system of electric braking in which the dynamo-electric machine or machines which normally operate as motors driving the load are employed as momentum-driven generators, and has for its object to provide a novel and convenient application of this now well-known system by which I am enabled to graduate the braking effect with great precision and also in case of an electric car or similar load prevent the reduction of braking effect by the slipping of the car-wheels along the rails.

In carrying out my invention I connect the dynamo-electric machine to the load to be braked by means of a magnetic clutch supplied with current from any suitable source, the said dynamo-electric machine being either electrically connected to a circuit containing resistance or else short-circuited by a connection having practically no resistance, and I provide means for varying within any desired limits the energizing-current supplied to the magnetic clutch.

Inasmuch as it is customary in the present state of the art to employ two or more motors on a single car, the embodiment of my invention which I have illustrated in this application comprises two dynamo-electric machines, one rigidly connected to its load, so that whenever the load is in motion it is in condition to generate current, and the other connected to the same load through a magnetic clutch and operating as a generator or as a motor in braking, according to the degree of magnetization of the clutch. The dynamo-electric machines are electrically connected in series and are short-circuited through the magnetic clutch, a shunt-circuit of variable resistance being provided for diverting more or less of the current from the energizing-winding of the clutch. The dynamo-electric machine which is rigidly connected to the load operates then as a generator to supply current to the magnetic clutch and at the same time assists in retarding the load, while the amount of retardation is determined by the force with which the second dynamo-electric machine is clutched to its load.

It has heretofore been attempted to retard a moving load—such as, for example, a car or train—by means of a braking system comprising two dynamo-electric machines rigidly connected to the load and electrically connected in series, so that both operate as momentum-driven generators, and such a system would be very effective were it not for the fact that the braking effect is liable to be suddenly reduced to a minimum by the slipping of the wheels to which one of the dynamo-electric machines is connected. The electromotive force generated in the braking-circuit when the two dynamo-electric machines are connected in series is of course double what it would be if they were connected in multiple, and consequently the current-flow in the braking-circuit as well as the braking effect may be varied within wide limits; but with the two machines thus rigidly connected to their respective car-wheels the system is subject to the objection that whenever the current in the braking-circuit reaches such an amount that the torque of either of the dynamo-electric machines operating as a generator becomes greater than that which can be transmitted by the load through the rolling friction of the car-wheels the wheels to which the said dynamo-electric machine is connected will begin to slip. The coefficient of friction is greatly diminished by such slipping, and, moreover, the current flowing through the machine connected to the slipping wheels is in the proper direction to drive the said machine as a motor in a direction opposite to that in which it has been operating as a generator. This machine is therefore liable to speed up as a motor and generate a counter electromotive force so considerable that the current flowing in the circuit of the dynamo-electric machines will be reduced to a minimum and the braking effect rendered practically *nil*. By my invention I am enabled to overcome this objection, the clutch connecting one of the dynamo-electric machines to its load being always so energized that the slipping will take place at the clutch itself instead of at the wheels, thereby substituting for the small bearing-surface between the wheels and the rails the large bearing-surface of the clutch and permitting the machine which is yieldably connected to its load to operate as a generator at a lower speed than the other machine or even as a motor driven in the reverse direction, but always so restrained that its speed as a motor cannot rise above a predetermined limit. With such an arrangement of apparatus it is manifest that means should be provided by which the clutch will rigidly attach its motor to the axle whenever current is supplied from the power-circuit to the dynamo-electric machines operating as motors. This I prefer to do by introducing the magnetic clutch into the main motor-circuit after the last or short-circuiting point of the resistance commonly employed, so that whenever current is supplied from the trolley to the motors the clutch will be held with sufficient power to insure a rigid attachment. The power consumed in this way is practically negligible.

Referring to the accompanying drawings, illustrating my invention, Figure 1 is a plan view of a car-truck, showing the motors and controllers and a clutch all arranged as described. Fig. 2 is a side elevation of the clutch, the car-axle being shown in cross-section. Fig. 3 is a section on the line 3 3 of Fig. 2. Figs. 4 and 5 are diagrams illustrating the circuit connections, and Figs. 6 and 7 are diagrams illustrating controllers adapted to make the circuit connections shown in Figs. 4 and 5.

In the mechanical figures, A is the frame of the truck, of which B B are the wheels, and C C are the controllers, and $M'$ $M^2$ the motors. D is the clutch connecting the motor $M^2$ to its axle through the pinion F and gear E.

In Figs. 2 and 3, H is the shaft or axle, and E the gear loosely mounted on said axle, a collar $e$ limiting the end play. The electromagnetic member D of the clutch is provided with the usual coils G and collector-rings $d\, d$, by which the coils are included in circuit in any desired manner, and the said member is capable of longitudinal motion along the shaft H, but is held from rotation with respect to the shaft by means of keys engaging slots in the shaft and magnetic member. The operation of these parts is as follows: Whenever current is caused to flow in the coils G, the disk D is magnetized and attracts the gear E, so that the pinion F (see Fig. 1) in rotating the gear also rotates the axle H. It is manifest that by the regulation of current in the coils G the attraction between the members of the clutch may be made as great as desired, either strong enough to revolve the axle at full speed or of such amount as will permit any desired slip.

In Fig. 4 I show the circuit connections which are employed when the dynamo-electric machines are operated as braking-generators. In this figure, $M'$ $M^2$ are the motors, and D the clutch. $R'$ represents the resistance usually employed for regulating the entire output of the dynamo-electric machines, and R a resistance shunted around the magnetic clutch, this latter resistance being made regulable, so that the current-flow in the clutch may be adjusted independently of the total flow in the circuit of the dynamo-electric machines. It is manifest that as the shunt around the magnetic clutch may be regulated from open circuit to short circuit the attraction of the latter may be varied within wide limits.

In Fig. 5 I show the circuit connections when the dynamo-electric machines are operated as motors with current supplied from the trolley connection. When thus operating, the current passes from the trolley T through the regulating resistance R and the clutch D directly to the motors and thence to ground, it being understood that whenever the motor with which the clutch is associated is supplied with current the current passes through the clutch, so as to maintain a rigid mechanical connection of the motor with its axle.

It is manifest that the arrangement shown in Fig. 4 may be operated according to various methods to produce the desired effects. For example, the resistance $R'$ may be fixed in value, or it may be made regulable, the same as the resistance R, or it may be entirely omitted. Also when the resistance $R'$ is made regulable the resistance R may be fixed in value, or both resistances may be simultaneously or successively varied, the only essential being that the clutch shall always be so energized that its members will begin to slip on each other before the torque of the motors, operating as generators, becomes great enough to cause the wheels to skid and slip along the rails.

In Figs. 6 and 7 I have illustrated diagrammatically the switches and circuit connections necessary for the carrying out of certain of the methods above specified, the changes necessary to adapt the system to the other methods mentioned being obvious to one skilled in the art.

Referring to Fig. 6, K represents the power-switch, RS the reversing-switch, and B the brake-switch, of a controller of the ordinary type, the contacts being shown developed on a plane surface, as is customary in diagrammatically illustrating such a structure. $M'$ and $M^2$ indicate the motors, which in the power position of the controller are operated to drive the car and in the braking position of the same are operated as braking-generators to bring the car to rest. D is the magnetic clutch, by means of which the second motor M² is connected to its car-axle. R is a resistance which in the power position of the controller is used as a regulating resistance in series with the motor-circuits and in the braking position as a shunt to the energizing-winding of the magnetic clutch. The several switches of the controller comprise each one or more sets of fixed contacts and one or more sets of contacts movable with respect thereto, the movable contacts being ordinarily mounted upon a cylindrical surface and brought into contact with the corresponding fixed contacts by the revolution of the cylinder. As shown in Figs. 6 and 7, the small circles indicate the fixed contacts of the several switches, the adjacent rectangles indicating the corresponding movable contacts. The power and reversing switches are each provided with a single set of fixed contacts; but the brake-switch has two such sets, one comprising the contacts 19' to 24', engaging in the braking position of the controller with the movable contacts 19$^b$ to 24$^b$, and the other comprising contacts 25' to 34', engaging in the off position of the brake-switch with the movable contacts 25$^a$ to 33$^a$ and in the operative position of said switch with the movable contacts 25$^b$ to 34$^b$. Interlocking devices are provided, as is customary in the art, so that the power-switch cannot be operated unless the brake-switch is in its off position nor the brake-switch operated unless the power-switch is in its off position nor the reversing-switch operated unless both the other switches are in their off position. With the power-switch K in its first operative position, the brake-switch B being in its off position, as shown, and the reversing-switch RS having been thrown to the left, so that its contacts a will engage with the corresponding fixed contacts 11' to 18', current entering from trolley T will pass through fixed contact 1' to the movable contact 1$^a$, thence through the cross-connected contact 2$^a$ to fixed contact 2' and conductor 2, through the resistance R to the conductor 7, through the magnetic clutch D to the fixed contact 25' on the brake-switch, thence by way of cross-connected contacts 25$^a$ and 29$^a$ of said switch and through conductor 14 to fixed contact 14' of the reversing-switch, through one of the contacts a to fixed contact 13', through motor-armature A', thence by way of conductor 12 to fixed contact 12' of the reversing-switch, and through another contact a of said switch to fixed contact 11' by way of wire 11 to fixed contact 32' on the brake-switch, and by way of cross-connected contacts 32$^a$ and 33$^a$ of said switch to contact 33', thence through the field-winding F' of the motor M' to the conductor 9, fixed contact 9' of the power-switch, and through cross-connected contacts 8$^a$ and 9$^a$ of said switch to fixed contact 8', by way of wire 8 to fixed contact 18' of the reversing-switch, through contact a of said switch to fixed contact 17', thence through the armature A² of the motor M² to wire 16, fixed contact 16', contact a of the reversing-switch, fixed contact 15', by way of wire 15 to fixed contact 27' of the brake-switch, and by way of cross-connected contacts 26$^a$ and 27$^a$ of said switch to contact 26', through field-winding F² of the motor M², by way of wire 10 through the fixed contact 10' of the power-switch to the movable contact 10$^a$, and thence to ground. In this position it will be seen that the magnetic clutch is included in the motor-circuit between the last resistance step and the armature of the first motor, so that whatever may be the position of the power-switch of the controller the said clutch will always be energized to hold its motor fixed to the corresponding car-axle. The circuit for this position of the controller is indicated in Fig. 5. Inasmuch as the power-switch K is of the ordinary construction, operating in its subsequent positions to gradually cut out the resistance R, then to connect the two motors in multiple with a portion of the resistance again inserted, and finally to again cut out this resistance, the circuits for the subsequent positions of the power-switch will not be traced. In the multiple position of the power-switch the clutch is included in the circuit of one of the motors only. Assuming that the car is in operation and that it is desired to bring the same to rest, the power-switch K will be thrown to its off position, and the brake-switch B thrown on, the reversing-switch RS remaining in the same position as before. In the first position of the brake-switch the circuit connections may be traced as follows: Starting from the plus brush of the armature A', Fig. 6, the circuit leads by way of conductor 13 to the fixed contact 13' of the reversing-switch, thence to fixed contact 14' of said switch and by way of conductor 14 to fixed contact 29' of the brake-switch, through cross-connected contacts 29$^b$ and 30$^b$ of said switch to fixed contact 30', thence to conductor 7, where the circuit divides, one branch leading through the magnetic clutch D and the fixed contact 25' of the brake-switch to the movable contact 25$^b$ and the other leading also from the conductor 7 through conductor 19 and fixed contact 19' to contact 19$^b$ and by way of cross connection to contact 25$^b$. From contact 25$^b$ the circuit leads through contact 26$^b$, connected thereto, to fixed contact 26', thence through the field-winding F² of the motor M² to fixed contact 28', through cross-connected contacts 27$^b$ and 28$^b$ to fixed contact 27', by way of conductor 15 to fixed contact 15' of the reversing-switch, thence to fixed contact 16', and by way of conductor 16 to and through the armature-winding A² of motor M², thence by way of wire 17 to fixed contact 17' of the reversing-switch to fixed contact 18' and to conductor 8, thence to fixed contact 34' of the brake-switch, and by way of cross-connected contacts 33$^b$ and 34$^b$ to fixed contact 33' through the field-winding F' of the motor M' to conductor 9, fixed contact 31' of the brake-switch, and by way of cross-connected contacts 31<sup>b</sup> and 32<sup>b</sup> to fixed contact 32', conductor 11, fixed contact 11' of the reversing-switch to fixed contact 12', and thence back to the negative brush of the armature A'. In the first position of the brake-switch the two motors are therefore connected in series with each other and with the magnetic clutch, the latter being shunted by a circuit of practically negligible resistance uniting its terminals, the connections differing from those shown in Fig. 4 only in that no resistance is inserted directly in the motor-circuit. In this position of the brake-switch the first machine M' operating as a generator driven by the car-axle, to which it is rigidly connected, supplies current to the second machine M², which is practically disconnected from its axle and causes it to revolve as a motor in a direction opposite to that in which it would be driven by its axle if the magnetic clutch were energized. If the controller is maintained in this position, the second machine will rise in speed, opposing a continually-increasing counter electromotive force to the first machine operating as a generator, until finally the current in circuit will be reduced to an amount which is just sufficient to operate the second machine as a motor running light. As the brake-switch is moved to its second position, however, a section of the resistance R is shunted around the magnetic clutch, and in the subsequent positions of the brake-switch this resistance is increased by the addition of other sections, until in the final position of the brake-switch the shunt-circuit around the magnetic clutch is opened, and the entire current generated passes through the same. The current supplied to the magnetic clutch is therefore gradually increased as the brake-switch is moved from its initial to its final position, and the magnetic clutch is in consequence energized more and more, thereby resisting more and more the tendency of the second machine to operate as a motor and tending to drive it in the opposite direction as a generator, until finally when the brake-switch is in its final position and the shunt-circuit around the magnetic clutch is opened both machines will operate as generators at the same speed unless the torque is excessive, in which case the members of the clutch will still continue to slip. The operation of the brake-switch in inserting resistance in shunt to the energizing-winding of the magnetic clutch is as follows: As the switch is moved from its first to its second position, the circuit through the conductor 19 and the contacts 19' and 19<sup>b</sup> is opened, so that the current generated must flow either through the magnetic clutch D to the contact 25<sup>b</sup> of the brake-switch or else through the first section of the resistance R to the conductor 6, and thence by way of conductor 20 and contacts 20' and 20<sup>b</sup> and the cross connection to contact 25<sup>b</sup>. In the third position a second section of the resistance R is similarly inserted, and so on until in the final position this branch circuit around the magnetic clutch is entirely opened.

In Fig. 7 I have shown another system for carrying out my invention in which there are employed two resistances R and R', the one being directly in the motor-circuit and the other capable of being shunted around the magnetic clutch. The system illustrated in this figure is otherwise the same as that shown in Fig. 6. In this figure supposing the power-switch K to be in its off position and the reversing-switch RS to be so thrown as to bring the contacts a under the fixed contacts 11' and 18' the brake-switch B in its first position makes the following circuit connections: Starting from the plus brush of the armature A' of the motor M' the circuit leads through contacts 13' and 14' of the reversing-switch to the conductor 14 and by way of fixed contacts 35' and 36' and cross-connected contacts 35<sup>b</sup> and 36<sup>b</sup> of the brake-switch to conductor 7, thence through the entire resistance R' to conductor 2, at which point the circuit divides, one branch leading through the magnetic clutch D and fixed contact 31' of the brake-switch to contact 31<sup>b</sup> and the other branch leading through fixed contacts 41' and 42' and cross-connected contacts 41<sup>b</sup> and 42<sup>b</sup> of the brake-switch to conductor 19, thence by way of fixed contact 19', movable contact 19<sup>b</sup>, and cross connection to contact 31<sup>b</sup>. From this point the circuit leads through contacts 32<sup>b</sup> and 32' through the field-winding F² of the motor M² to conductor 10, thence by way of contacts 33' and 34' and cross-connected contacts 33<sup>b</sup> and 34<sup>b</sup> to conductor 15, through contacts 15' and 16' of the reversing-switch to conductor 16, thence through the armature A² of the motor M² and by way of conductor 17 and contacts 17' and 18' of the reversing-switch to conductor 8, thence through contacts 39' and 40' and cross-connected contacts 39<sup>b</sup> and 40<sup>b</sup> of the brake-switch through the field-winding F' of the motor M' to conductor 9, through contacts 37' and 38' and cross-connected contacts 37<sup>b</sup> and 38<sup>b</sup> of the brake-switch to the conductor 11, and through contacts 11' and 12' of the reversing-switch to conductor 12 and to the minus brush of the armature A'. The two motors are thus connected in series with each other and with the magnetic clutch D, the resistance R' being also included in circuit and the terminals of the magnetic clutch being shunted by a circuit of practically negligible resistance. The circuit connections for this position of the brake-switch are shown in Fig. 4. In this position the first machine operating as a generator will tend to drive the second machine as a motor, the system differing from that shown in Fig. 6 only in that the current in the circuit of the two dynamo-electric machines is limited by the resistance R', as well as by the counter electromotive force of the second dynamo-electric machine operating as a motor. In the second position of the brake-switch the contact 19<sup>b</sup> leaves its corresponding contact 19', and the first section of the resistance R is thereby shunted around the terminals of the magnetic clutch, the shunt-circuit now passing through contacts 20' and 20$^b$ of the brake-switch. In this position the contact 25$^b$ comes also into engagement with the contact 25', but since the contacts 25$^b$ to 30$^b$, inclusive, are not cross-connected to any of the other contacts of the brake-switch no circuit is completed in this position through the said contacts. In the third position of the brake-switch, however, the first section of the resistance R remains as before, shunted around the terminals of the magnetic clutch, while the first section of the resistance R' is short-circuited by the contact 26$^b$ coming into engagement with the contact 26'. As the brake-switch is moved farther the resistance shunted around the terminals of the magnetic clutch is gradually increased and the resistance included directly in circuit with the dynamo-electric machines is gradually reduced, the changes in values of the two resistances taking place successively in the manner already explained, until in the final position of the brake-switch the shunt-circuit around the magnetic clutch is opened and the resistance R' entirely short-circuited, the two machines in this position sending the entire current generated through the magnetic clutch D.

As before stated, it is obvious that the two systems shown in Figs. 6 and 7 are not the only ones by which my method of braking may be carried out, but the changes in connections required for other modifications will be obvious to one skilled in the art. For example, the contacts on the brake-switch which control the resistance R' might be omitted and this resistance controlled by a switch operated by hand, so that a certain definite portion of the resistance R' might be continually in circuit in the braking position of the controller, or, on the other hand, contacts of the brake-switch which control the resistance R might be omitted and a hand-switch provided for shunting more or less resistance around the magnetic clutch D, the magnetic clutch being thus shunted in the braking position of the controller by a definite resistance, and the resistance R' being varied to produce the desired variations in braking.

The details of the system by means of which this method of braking is or may be carried out may evidently be widely varied without departing from the spirit and scope of my invention. The specific arrangements which I have shown herein are particularly well adapted for carrying out this method, and they constitute the subject-matter of the application of which this a division. It is, however, to be understood that the present invention is not limited to any particular system or set of connections.

What I claim as new, and desire to secure by Letters Patent of the United States, is—

1. The method of braking a moving load, which consists in so connecting the electrical circuits of a dynamo-electric machine that it will operate to retard the movement of said load when connected thereto, and gradually clutching said dynamo-electric machine to said load.

2. The method of braking a moving load, which consists in gradually clutching a dynamo-electric machine to said load, and causing a current to flow through said dynamo-electric machine in such a direction as to oppose the motion imparted by the moving load.

3. The method of braking a moving load, which consists in causing said load to drive a dynamo-electric machine as a generator, supplying current from said generator to a second dynamo-electric machine to operate it as a motor, and gradually clutching said second dynamo-electric machine to said moving load.

In witness whereof I have hereunto set my hand this 18th day of March, 1902.

FRANK E. CASE.

Witnesses:
BENJAMIN B. HULL,
HELEN ORFORD.